United States Patent
Yaguchi

(10) Patent No.: US 7,532,348 B2
(45) Date of Patent: May 12, 2009

(54) IMAGE INPUT/OUTPUT CONTROL METHOD AND IMAGE INPUT/OUTPUT APPARATUS

(75) Inventor: Hiroyuki Yaguchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/930,551

(22) Filed: Oct. 31, 2007

(65) Prior Publication Data

US 2008/0174823 A1    Jul. 24, 2008

Related U.S. Application Data

(63) Continuation of application No. 10/784,809, filed on Feb. 24, 2004, now Pat. No. 7,307,762.

(30) Foreign Application Priority Data

Feb. 28, 2003    (JP) .............................. 2003-053897

(51) Int. Cl.
*G06F 15/00* (2006.01)

(52) U.S. Cl. ................ 358/1.15; 358/1.16; 358/426.02; 358/444; 358/524

(58) Field of Classification Search ................. 358/1.1, 358/1.2, 1.9, 1.13, 1.15, 1.16, 1.17, 425.05, 358/426.03, 426.06, 426.14, 426.02, 444, 358/524; 382/166, 236, 239, 246, 256; 709/206; 386/46

See application file for complete search history.

(56) References Cited

U.S. PATENT DOCUMENTS

| | | | |
|---|---|---|---|
| 4,896,146 A | | 1/1990 | Narumiya |
| 5,239,388 A | * | 8/1993 | Matsumoto ................. 358/448 |
| 5,383,754 A | * | 1/1995 | Sumida et al. ................ 412/11 |
| 5,576,840 A | * | 11/1996 | Fukushima .................. 386/46 |
| 5,726,762 A | | 3/1998 | Akada et al. |
| 5,774,231 A | * | 6/1998 | Yoshida ....................... 358/434 |
| 5,812,817 A | | 9/1998 | Hovis et al. |
| 5,937,152 A | | 8/1999 | Oda et al. |
| 6,043,897 A | | 3/2000 | Morikawa et al. |
| 6,064,489 A | * | 5/2000 | Nosaki et al. .............. 358/1.13 |
| 6,154,569 A | * | 11/2000 | Sakaue et al. ............... 382/233 |
| 6,184,997 B1 | | 2/2001 | Hanyu et al. |
| 6,198,841 B1 | | 3/2001 | Toyama et al. |
| 6,259,811 B1 | | 7/2001 | Tsuji |
| 6,298,404 B1 | * | 10/2001 | Mishra ........................ 358/1.1 |
| 6,342,950 B1 | * | 1/2002 | Tabata et al. ................. 358/1.6 |
| 6,377,702 B1 | | 4/2002 | Cooper |

(Continued)

FOREIGN PATENT DOCUMENTS

EP    1085749 A2    3/2001

(Continued)

*Primary Examiner*—Kimberly A Williams
(74) *Attorney, Agent, or Firm*—Fitzpatrick, Cella, Harper & Scinto

(57) ABSTRACT

In the case in which an image processing mode is a high-speed copy mode in which follow-up control is possible, setting is made to perform "follow-up control" for setting a mode for not compressing an image or a fixed length compression mode for an image read by a scanner, storing an inputted image in a memory in accordance with the setting, and outputting the image stored in the memory to a printer during scanning. Consequently, image input/output processing from input and storage of an image in the memory until output of the stored image can be performed at high speed.

15 Claims, 17 Drawing Sheets

U.S. PATENT DOCUMENTS

| | | |
|---|---|---|
| 6,424,742 B2 | 7/2002 | Yamamoto et al. |
| 6,508,169 B1 | 1/2003 | Sato |
| 6,519,052 B1 | 2/2003 | Oneda et al. |
| 6,553,143 B2 * | 4/2003 | Miyake et al. ............... 382/239 |
| 6,671,069 B1 | 12/2003 | Kurosawa et al. |
| 6,798,534 B1 * | 9/2004 | Nishigaki et al. .......... 358/1.16 |
| 7,009,722 B1 * | 3/2006 | Nishigaki .................. 358/1.15 |
| 7,099,036 B2 | 8/2006 | Maeda et al. |
| 7,227,665 B2 * | 6/2007 | Shoda et al. ............... 358/1.17 |
| 7,307,758 B2 * | 12/2007 | Moro ......................... 358/2.1 |
| 2002/0012474 A1 | 1/2002 | Sato et al. |
| 2002/0044298 A1 | 4/2002 | Kaneko et al. |
| 2002/0102027 A1 * | 8/2002 | Miyake et al. ............... 382/239 |
| 2004/0095594 A1 | 5/2004 | Moro |
| 2004/0095605 A1 * | 5/2004 | Moro ......................... 358/2.1 |
| 2004/0141205 A1 * | 7/2004 | Shoda et al. ............... 358/1.17 |

FOREIGN PATENT DOCUMENTS

| | | |
|---|---|---|
| EP | 1427183 A1 | 6/2004 |
| JP | 04-037262 A | 2/1992 |
| JP | 05-183761 | 7/1993 |
| JP | 10-164333 | 6/1998 |
| JP | 11-69150 | 3/1999 |
| JP | 11-298704 | 10/1999 |
| JP | 11-331457 | 11/1999 |
| JP | 2001-53920 | 2/2001 |
| JP | 2001-103473 A | 4/2001 |
| JP | 2001-292279 A | 10/2001 |
| JP | 2002-165101 A | 6/2002 |
| JP | 2002-247386 A | 8/2002 |

* cited by examiner

IMAGE INPUT/OUTPUT CONTROL METHOD AND IMAGE INPUT/OUTPUT APPARATUS

CROSS REFERENCE TO RELATED APPLICATIONS

This application is related to and claims priority to U.S. application Ser. No. 10/748,809, entitled Image Input/Output Control Method and Image Input/Output Apparatus, inventor Hiroyuki Yaguchi, filed on Feb. 24, 2004, in the United States Patent and Trademark Office, the disclosure of which is incorporated herein by reference.

FIELD OF THE INVENTION

The present invention relates to a technique for inputting and storing an image in a memory and outputting the stored image.

BACKGROUND OF THE INVENTION

In recent years, a digital copying machine has a memory and performs an image processing procedure for once storing a digital image read from a scanner on the memory and sending the stored digital image to a printer. Further, a black and white copying machine often uses binary uncompressed data at the point when the digital image is read from the scanner because only a small capacity is required. On the other hand, since a color image has levels of gray of 8 bit/pixel for each color of R, G and B, it is difficult to store the color image in a memory as uncompressed data. Therefore, in the case of the color image, there has been proposed a method of performing data compression such as JPEG to store the color image.

On the other hand, in order to further increase speed of a high-speed copy mode of the digital copying machine, control for causing a printer to start printing when a predetermined amount of digital images from a scanner are stored in a memory (hereinafter referred to as follow-up control) is performed.

In a variable-length coding method such as the above-described JPEG, a compression rate is high, however, since a coding amount per a fixed time is not decided, time until the predetermined amount of digital images are stored in the memory is unfixed. As a result, timing for starting printing is lost, and the follow-up control cannot be performed.

SUMMARY OF THE INVENTION

The present invention has been devised in order to solve the above-described problems, and it is an object of the present invention to perform image input/output processing from input and storage of an image in a memory to output of the stored image at a high speed.

In order to attain the above-described object, according to an aspect of the present invention, there is provided an image input/output control method which includes: a storage step of compressing inputted image data with a predetermined compression method according to an image processing mode and storing the compressed image data in a memory; an output step of outputting the image data stored in the storage step; and a control step of performing control so as to start the output of the image data in the output step while the image data is being stored in the memory in the storage step.

In addition, according to another aspect of the present invention, there is provided an image input/output apparatus which includes: storing means which compresses inputted image data with a predetermined compression method according to an image processing mode and stores the compressed image data in a memory; output means which outputs the image data stored by the storing means; and control means which performs control so as to start the output of the image data with the output means while the image data is being stored in the memory by the storing means.

Other objects of the present invention will be apparent from drawings and a detailed description of the invention which follow.

DETAILED DESCRIPTION OF THE PREFERRED EMBODIMENTS

An embodiment in accordance with the present invention will be described in detail with reference to the accompanying drawings.

In this embodiment, in the case of a predetermined mode such as a high-speed copy mode, inputted image data is stored in a memory in an uncompressed state or stored in a memory with a coding amount per fixed time thereof fixed using fixed length compression to make it possible to perform "follow-up control" which causes a printer to start printing when a predetermined amount of image data is stored in the memory. In addition, in the case of a high-quality copy mode for a color image, variable length compression is used to reduce an amount of memory consumption.

Figure 1:
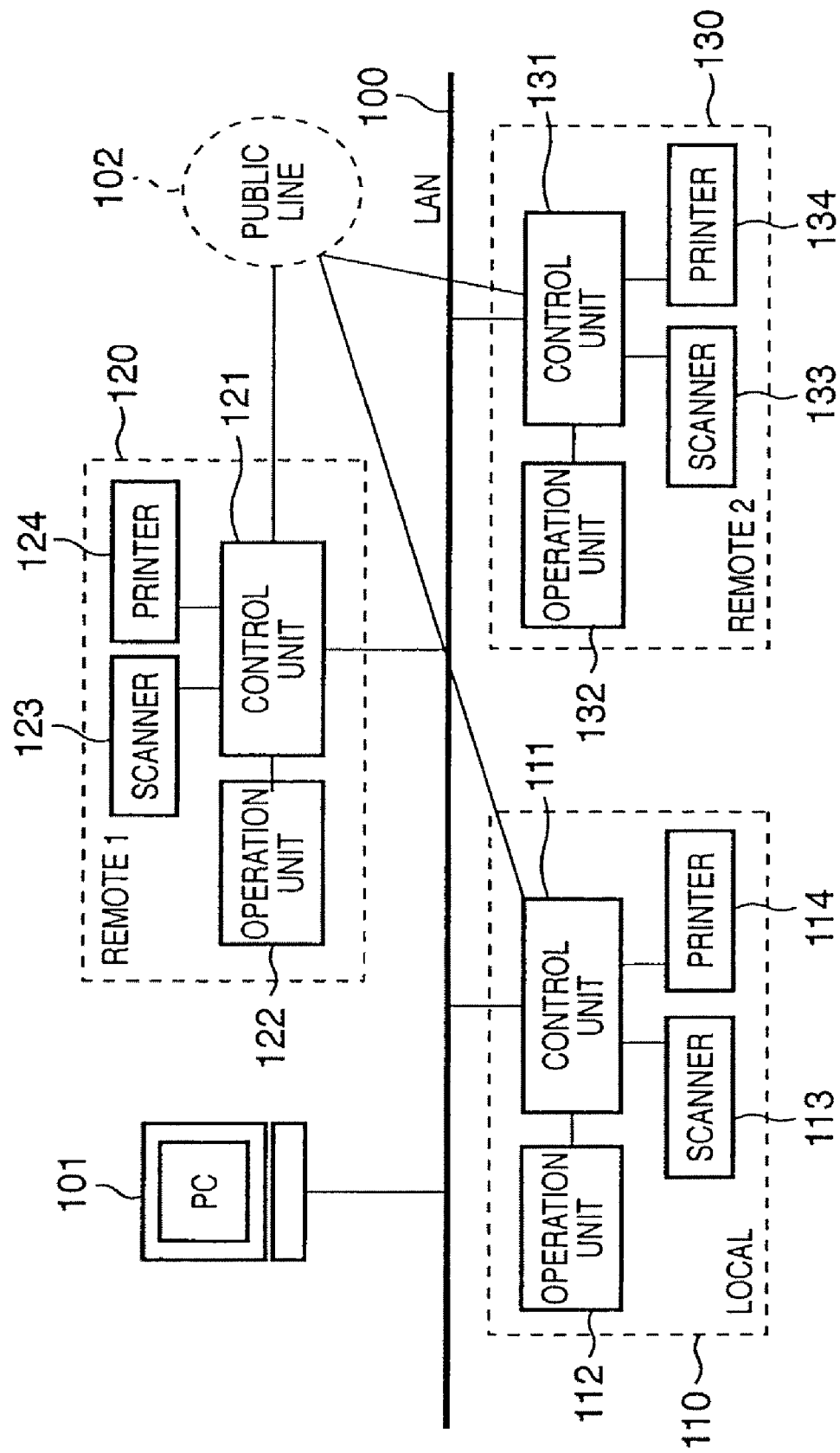
FIG. 1 is a block diagram showing an overall structure of an image forming system according to an embodiment of the present invention.

FIG. 1 is a block diagram showing an overall structure of an image forming system according to the embodiment. As shown in FIG. 1, an image forming apparatus 110 includes a scanner unit 113 serving as an image input device, a printer unit 114 serving as an image output device, a control unit 111, and an operation unit 112 serving as a user interface. The scanner unit 113, the printer unit 114, and the operation unit 112 are connected to the control unit 111 and controlled by a command from the control unit 111, respectively. In addition, the control unit 111 is connected to network transmission means such as a local area network (LAN) 100 and a public line 102. Transmission by G3 and G4 facsimile machines including color image transmission is possible from the public line 102.

In addition, other image forming apparatuses 120 and 130, which have the same configuration as the image forming apparatus 100, are also connected to the LAN 100. Further, the image forming apparatus 120 includes a scanner unit 123, a printer unit 124, and an operation unit 122, which are connected to a control unit 121 and controlled by the control unit 121. The image forming apparatus 130 includes a scanner unit 133, a printer unit 134, and an operation unit 132, which are connected to a control unit 131 and controlled by the control unit 131, respectively.

In addition, a personal computer (PC) 101 is connected to network transmission means such as the LAN 100. The personal computer 101 can send and receive files and electronic mails using a standard file transfer protocol such as FTP or SMB.

Figure 2:
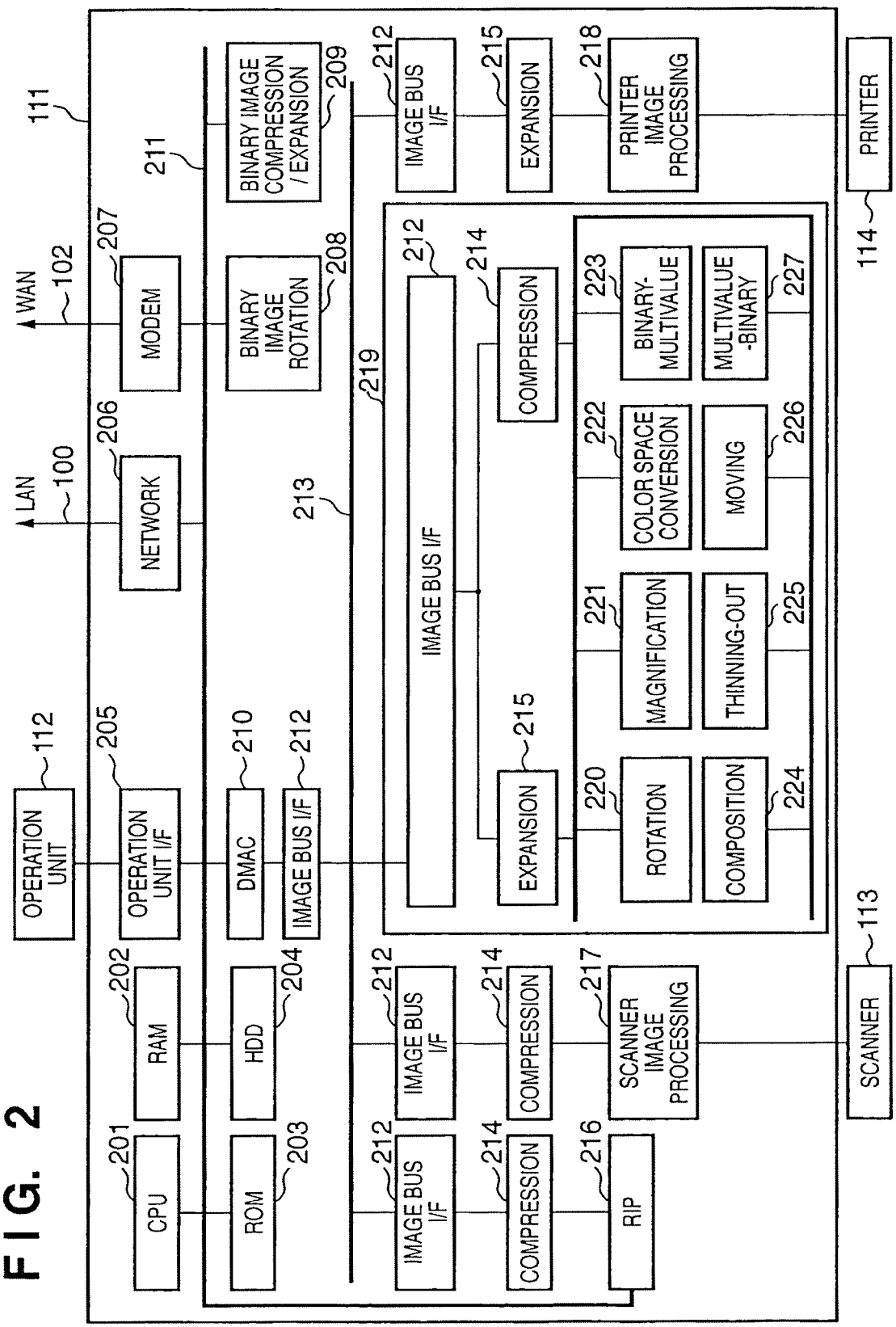
FIG. 2 is a block diagram showing a detailed structure of an image forming apparatus shown in FIG. 1.

FIG. 2 is a block diagram showing a detailed structure of the image forming apparatus shown in FIG. 1. As shown in FIG. 2, the control unit 111 is a controller for performing input and output of image information and device information by making connection to the scanner 113 serving as an image input device and the printer 114 serving as an image output device and, on the other hand, making connection to the LAN 100 and the public line (WAN) 102.

In the control unit 111, a CPU 201 controls the entire apparatus. A RAM 202 is a system work memory which is used when the CPU 201 executes processing. In addition, the RAM 202 is also an image memory for temporarily storing image data. A ROM 203 is a boot ROM, in which a boot program, control data, and the like for the apparatus are stored. An HDD 204 is a hard disk drive, which stores system software and image data.

An operation unit I/F 205 controls interface with the operation unit (UI) 112 and outputs image data, which is to be displayed on the operation unit 112, to the operation unit 112. In addition, the operation unit I/F 205 plays a role of transmitting instruction information, which a user has inputted via the operation unit 112, to the CPU 201.

A network interface 206 controls connection with the LAN 100, and inputs information to and outputs information from the LAN 100. A modem 207 controls connection with the public line 102, and inputs information to and outputs information from the public line 102. A binary image rotation unit 208 and a binary image compression/expansion unit 209 converts a direction of a binary image before the image is sent through the modem 207 and converts a resolution of the image into a predetermined resolution or a resolution suitable for an ability of an apparatus on which the image is displayed. In addition, the binary image compression/expansion unit 209 supports JBIG, MMR and MH. A DMAC 210 is a DMA controller, which reads an image stored in the RAM 202 without intervention of the CPU 201 to transfer the image to an image bus I/F to be described later or writes an image from an image bus to be described later in the RAM 202 without intervention of the CPU 201. The above-described devices are arranged on a system bus 211.

An image bus interface (I/F) 212 is an interface for controlling high-speed input and output of an image via the image bus 213. A compression device 214 is a compression device for compressing an image with JPEG by a unit of 32×32 pixels before sending the image to the image bus 213. This compression device 214 can compress an image with JPEG according to register setting and, in addition, can select non-compression and fixed length compression such as vector quantization. An expansion device 215 is an expansion device for expanding an image which is sent via the image bus 213. In the same manner as the compression device 214, the expansion device 215 can choose whether an image compressed by the compression device 214 according to register setting is expanded and outputted or an uncompressed image is directly outputted.

A raster image processor (RIP) 216 inputs an intermediate code, which is converted from a PDL code received from the host computer 101 via the network interface 206 and is stored in the RAM 202 by the CPU 201, via the system bus 211 and expands the intermediate code into a bitmap image (multivalue). A scanner image processing unit 217 applies various kinds of appropriate image processing (e.g., correction, processing, and edition) to a color image or a black and white image from the scanner 113 and outputs the image (multivalue). Similarly, a printer image processing unit 218 applies various kinds of appropriate image processing (e.g., correction, processing, and edition) to the printer 114. At the time of printing, binary output and multivalue output are possible because binary-multivalue conversion is performed by the expansion unit 215.

An image conversion unit 219 has various image conversion functions which are applied when an image on the RAM 202 is converted and stored in the RAM 202 again. A rotation device 220 can rotate an image of a unit of 32×32 pixels at a designated angle, and copes with binary and multivalue input and output. A magnification device 221 has a function for converting (e.g., from 600 dpi to 200 dpi) or magnifying (e.g., from 25% to 40%) a resolution of an image. Note that, before magnification, the magnification device 221 rearranges an image of 32×32 pixels as an image of a unit of 32 lines. A color space conversion unit 222 converts an image inputted in multivalue according to a matrix operation and a lookup table (LUT), for example, converts a YUV image on a memory into a Lab image, and stores the image on the memory. In addition, this color space conversion unit has a 3×8 matrix operation and a one-dimensional LUT and can perform publicly known base skipping and show-through prevention. The converted image is outputted in multivalue.

A binary-multivalue conversion unit 223 converts a 1 bit binary image into an image of multivalue 8 bits and 256 levels of gray. Conversely, a multivalue-binary conversion unit 227 converts an image of 8 bits and 256 levels of gray on a memory into an image of 1 bit and 2 levels of gray, and stores the image on the memory. A composition unit 224 has a function of compositing two multivalue images as one multivalue image. For example, the composition unit 224 can easily attach a company logo to an original image by compositing the company logo on the memory and the original image. A thinning-out unit 225 performs resolution conversion by thinning out pixels of a multivalue image. Here, ½, ¼ and ⅛ multivalue images can be outputted. In addition, enlargement and reduction in a larger area can be performed by using the thinning-out unit 225 with the magnification unit 221. A moving unit 226 adds a margin part to an inputted binary image or multivalue image or deletes the margin part to output the image.

The rotation unit 220, the magnification unit 221, the color space conversion unit 222, the binary-multivalue conversion unit 223, the composition unit 224, the thinning-out unit 225, the moving unit 226, and the multivalue-binary conversion unit 227 are capable of operating in association with each other. For example, in the case in which a multivalue image on a memory is subjected to image rotation processing and resolution conversion processing, both the image rotation processing and the resolution conversion processing can be performed in association with each other without intervention of the memory.

Figure 3:
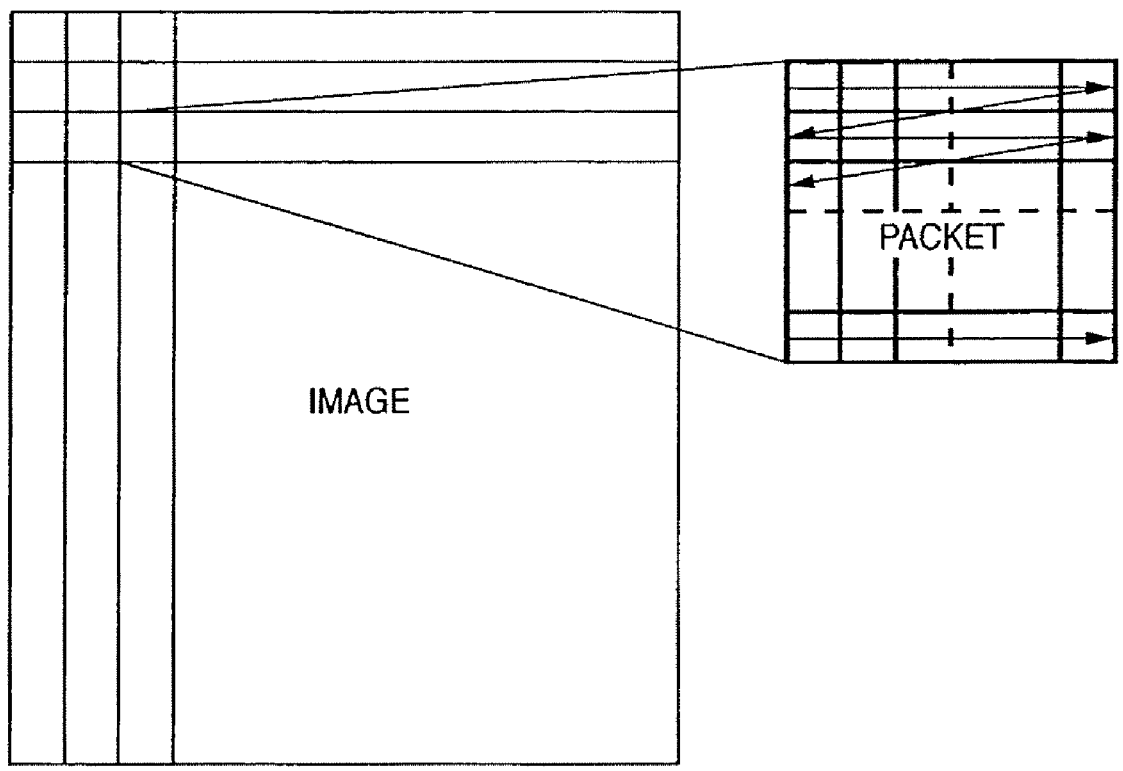
FIG. 3 is a diagram showing a data format of an image in this embodiment.

FIG. 3 is a diagram showing a data format of an image in this embodiment. A data format of an image used in this embodiment is an image packet structure disclosed in Japanese Patent Laid-Open No. 2001-103473. The compression unit 214 rearranges an image of a raster format as a packet of a unit of 32×32 pixels as shown in FIG. 3 and performs JPEG compression by a unit of packet. At the same time, the compression unit 214 adds information such as an ID, a color space, a Q table ID, and a data length, which indicates a position of the packet and a compression system (JPEG, vector quantization, or non-compression), to the packet and sets the information as a header. Further, the compression unit 214 also compresses binary data indicating characters and photographs (image area flag) and attaches the binary data following JPEG.

Figure 4:
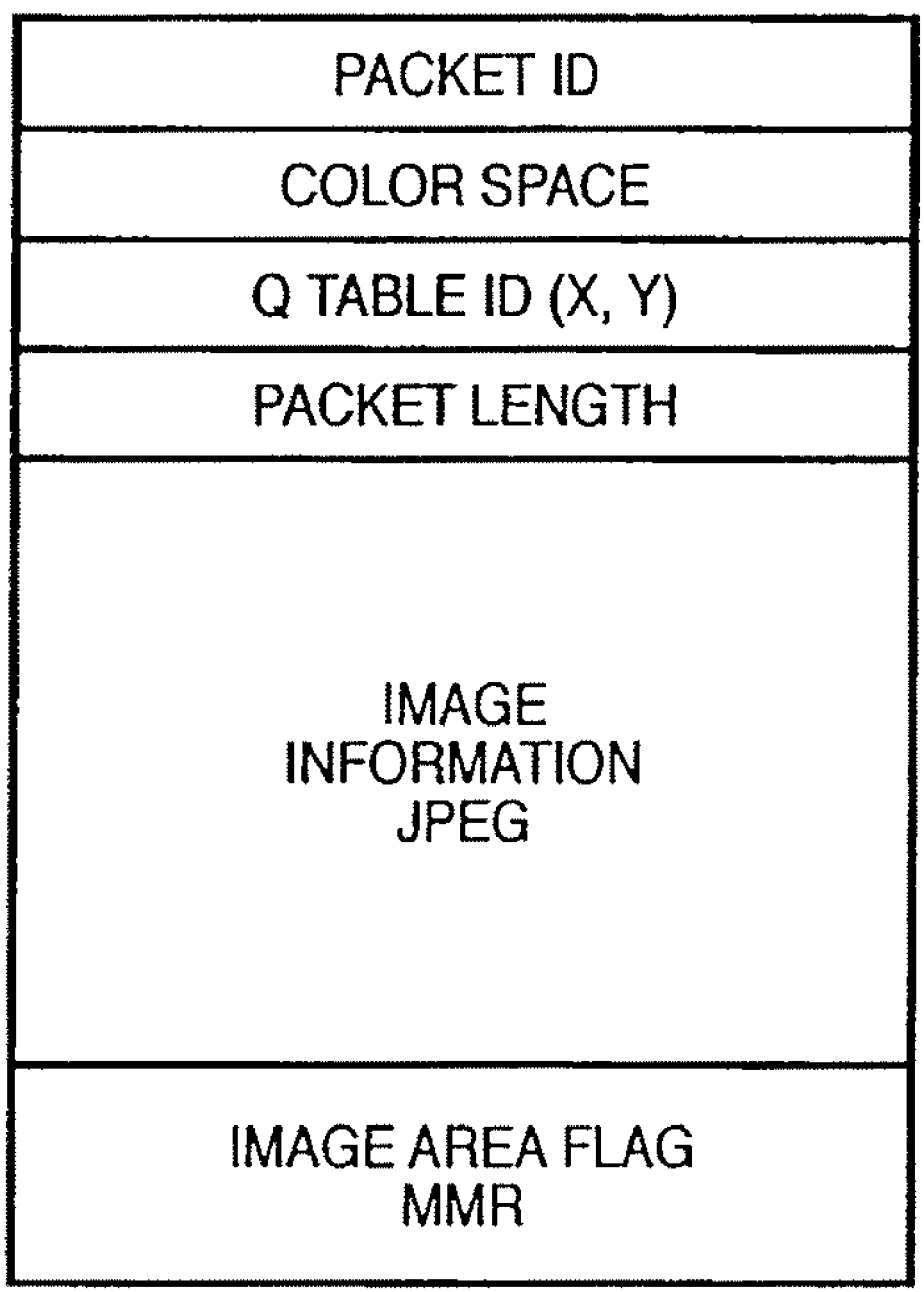
FIG. 4 is a diagram showing a structure of packet data in this embodiment.

FIG. 4 is a diagram showing a structure of packet data in this embodiment. The expansion unit 215 expands the JPEG and rearranges the raster image as a packet image on the basis of this header information. By changing the raster image to such a packet image, only an image inside the packet is rotated at the time of image rotation to change a position of the packet ID. Thus, since the image can be partially rotated by expansion and compression, the image rotation is very efficient. All images flowing through the image bus I/F 212 are packet images.

In addition, in the case in which a raster image is required in facsimile transmission, the binary image rotation unit 208, the binary image compression/expansion unit 209, or the like, conversion from a packet image to a raster image is performed by software.

Figure 5:
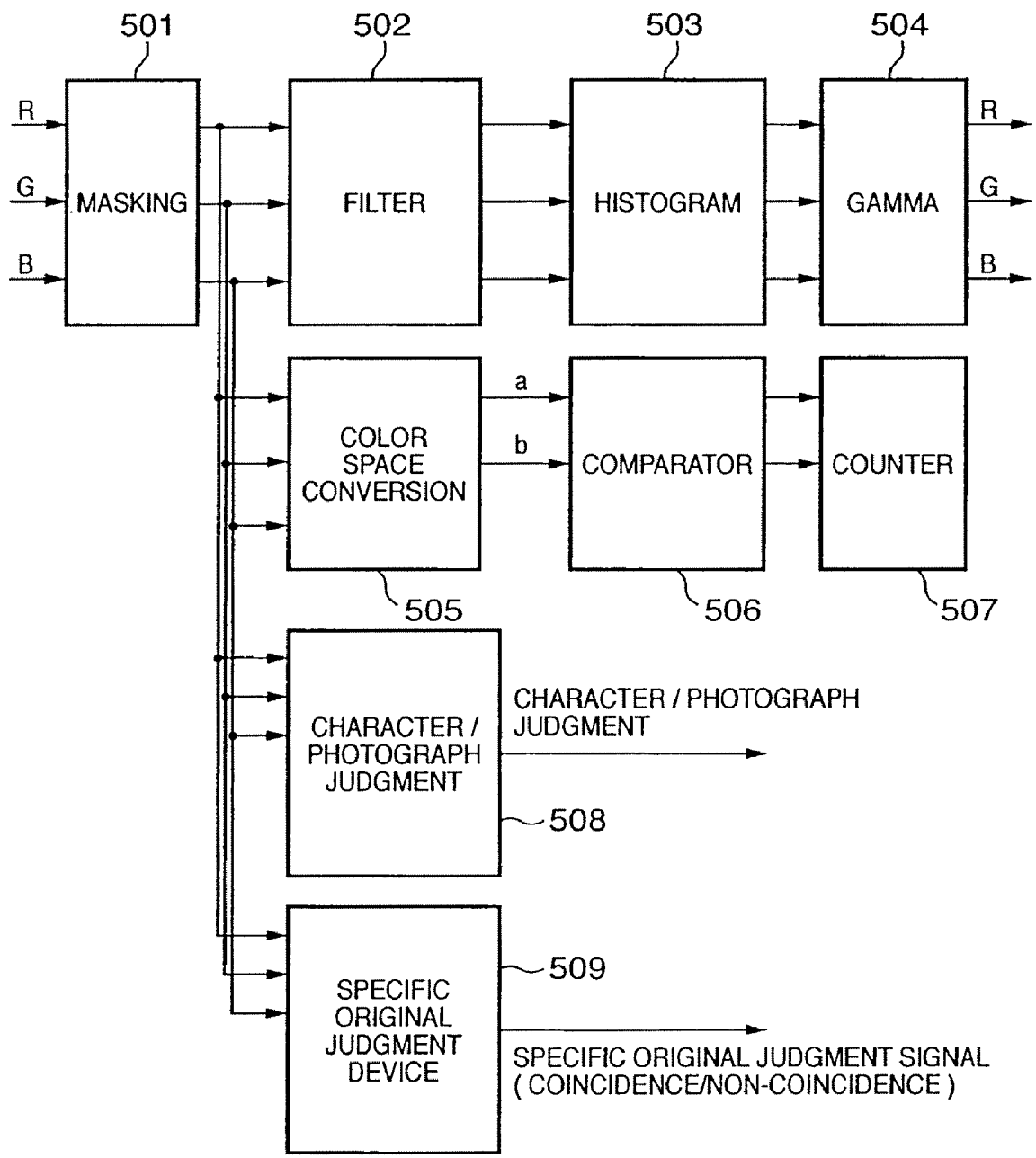
FIG. 5 is a block diagram showing a structure of a scanner image processing unit 217 shown in FIG. 2.

FIG. 5 is a block diagram showing a structure of the scanner image processing unit 217 shown in FIG. 2. Luminance signals of 8 bits of R, G and B inputted from the scanner 113 are converted into standard R, G and B color signals, which do not depend upon a filter color of a CCD, by a masking unit 501. The converted R, G and B signals are inputted to a filter 502, which is constituted by, for example, a 9×9 matrix, and processing for shading off an image or giving contrast to the image is performed. A histogram 503 is a processing unit which performs sampling of image signal data in an inputted image and is used for base level judgment of the inputted image. In this module, R, G and B data in a rectangular area, which is surrounded by start points and end points designated in a main scanning direction and a sub scanning direction, respectively, are sampled at a fixed pitch in the main scanning direction and the sub scanning direction to create a histogram. The created histogram is read out when base skipping or show-through prevention is designated, and base of an original is estimated from the histogram. The histogram is saved and managed in a memory or an HDD together with an image as a base skipping level and is used for image processing at the time of printing and transmission. A gamma unit 504 performs processing so as to increase or decrease concentration of an entire image. The gamma unit 504 is a portion for converting a color space of an inputted image into an arbitrary color space or performing correction processing concerning a color tint of an input system.

In addition, in order to judge whether an original is a color original or a black and white original, an image signal before magnification is converted into an image signal of a publicly known Lab space by a color space conversion unit 505. In the image signal, "a" and "b" indicate color signal components. If the color signal components are equal to or more than a predetermined level in a comparator 506, it is judged that the original is an original of a chromatic color and, if not, it is judged that the original is an original of an achromatic color, and a judgment signal of one bit is outputted from the comparator 506. Then, a counter 507 counts output from the comparator 506.

Moreover, a character/photograph judgment unit 508 extracts a character edge from R, G and B signals outputted from the masking unit 501 and separates an inputted image into characters and photographs. A "character/photograph judgment signal" is obtained as an output. This signal is also stored in the memory or the HD (hard disk) together with the image and used at the time of printing.

On the other hand, a specific original judgment device 509 is capable of comparing an inputted image signal and a pattern held therein to find to which degree the inputted image signal and the pattern coincide with each other and outputting a result of judgment indicating coincidence and non-coincidence as shown in the figure. Then, according to the result of judgment, the image can be processed to prevent forgery of bills and securities.

Figure 6:
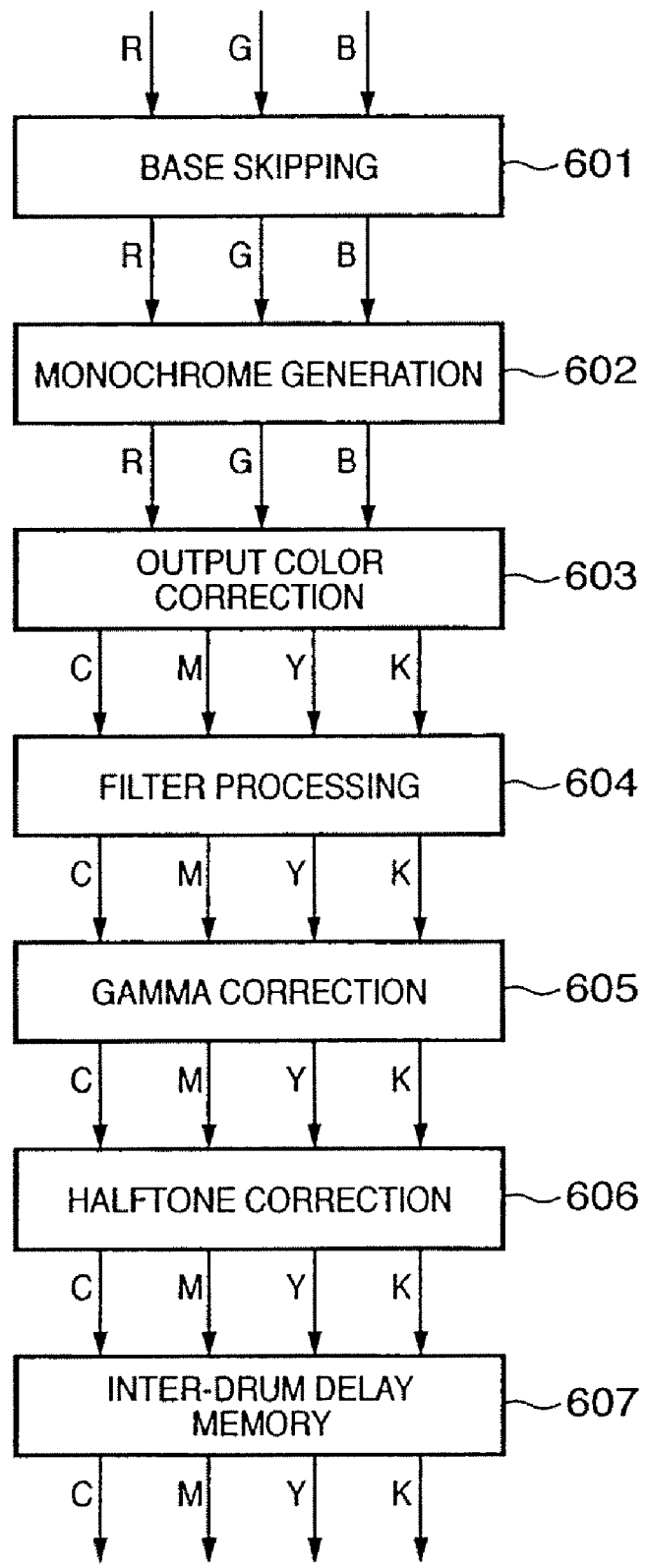
FIG. 6 is a block diagram showing a structure of a printer image processing unit 218 shown in FIG. 2.

FIG. 6 is a block diagram showing a structure of the printer image processing unit 218 shown in FIG. 2. In FIG. 6, reference numeral 601 denotes a base skipping unit, which skips a base color of image data to perform fog removal of an unnecessary base. For example, the base skipping unit 601 performs base skipping according to a 3×8 matrix operation or a one-dimensional LUT. This is a function which is also included in the histogram 503 as described above, and is completely an equivalent circuit. Reference numeral 602 denotes a monochrome generation unit, which converts color image data, for example, R, G and B data into a single color gray in converting the color image data into monochrome data and printing the data as a single color. For example, the monochrome generation unit 602 is constituted by a 1×3 matrix operation which multiplies R, G and B by an arbitrary constant to find a gray signal. Reference numeral 603 denotes an output color correction unit, which performs color correction in accordance with characteristics of the printer 114 which outputs image data. For example, the output color correction unit 603 processes image data according to a 4×8 matrix operation or direct mapping.

Reference numeral 604 denotes a filter processing unit, which corrects a spatial frequency of image data arbitrarily. For example, the filter processing unit 604 corrects a spatial frequency according to a 9×9 matrix operation. Reference numeral 605 denotes a gamma correction unit, which performs gamma correction of image data in accordance with characteristics of a printer unit which outputs the image data. The gamma correction unit 605 is usually constituted by a one-dimensional LUT. Reference numeral 606 is a halftone correction unit, which performs arbitrary halftone processing in accordance with the number of levels of gray of the printer unit which outputs image data. More specifically, the halftone correction unit 606 performs arbitrary screen processing and error diffusion processing such as binarization and 32-arization. It is also possible to switch the arbitrary screen processing and the error diffusion processing according to a not-shown character/photograph judgment signal. Further, reference numeral 607 denotes an inter-drum delay memory, which is a memory for, in a color printer having drums of colors C, M, Y and K, superimposing C, M, Y and K images by staggering print timing of C, M, Y and K by a space among drums. In other words, the inter-drum delay memory 607 can delay the print timing in order to align images in the color printer having four drums of colors C, M, Y and K.

Figure 7:
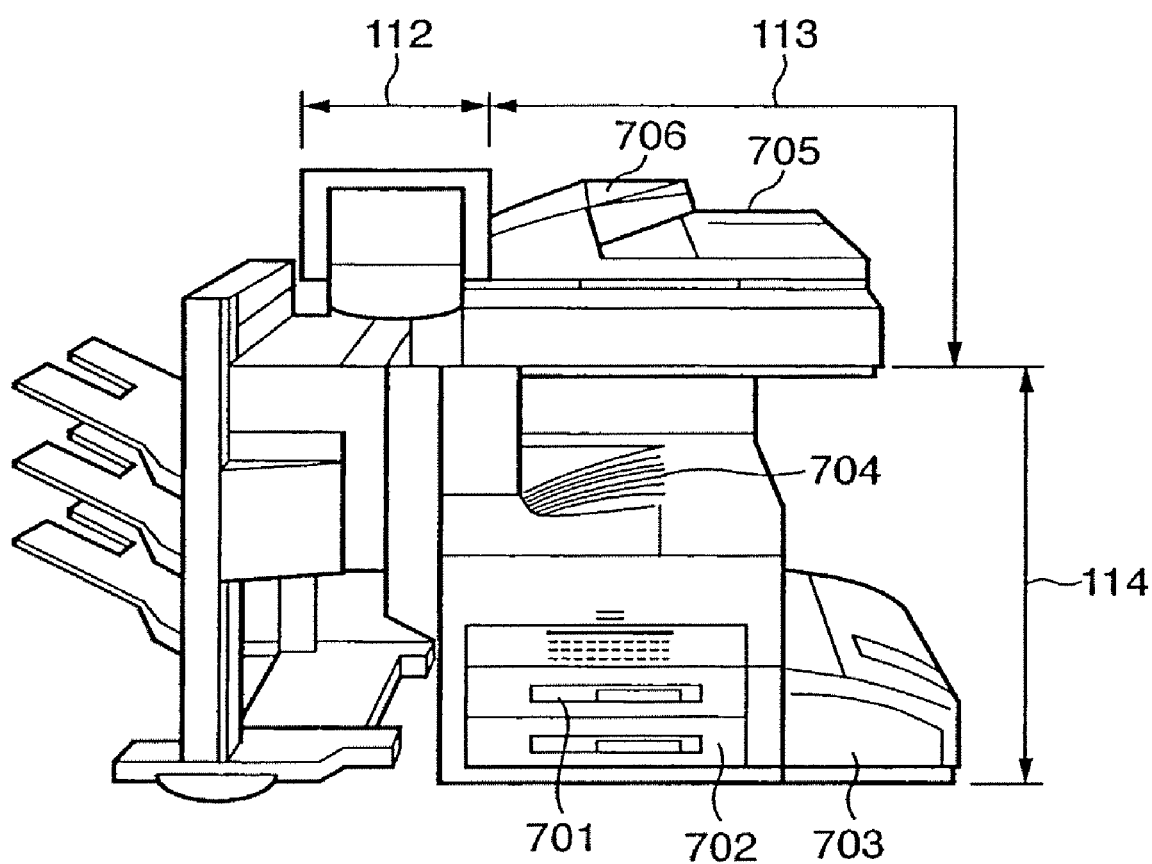
FIG. 7 is a diagram showing an external appearance of the image forming apparatus in this embodiment.

FIG. 7 is a diagram showing an external appearance of the image forming apparatus in this embodiment. The scanner 113 serving as an image input device shown in FIG. 7 scans an image on an original with a CCD line sensor (not shown) to thereby optically read the image, and generate and output raster image data. When a user sets originals in a tray 706 of an original feeder 705 and instructs start of reading in the operation unit 112, the controller CPU 201 gives an instruction to the scanner 113, the feeder 705 feeds the originals one by one, and the scanner 113 performs an operation for reading images on the originals.

In addition, the printer 114 serving as an image output device is a portion which prints raster image data on a sheet. As a system for the printer 114, there are an electrophotographic system using a photosensitive drum and a photosensitive belt, an ink jet system for discharging ink form a very small nozzle array to directly print an image on a sheet, and the like. However, any system will do. Note that a print operation is started by an instruction from the controller CPU 201.

Further, the printer 114 has plural sheet feeding stages such that different sheet sizes or different sheet orientations can be selected. There are sheet cassettes 701, 702 and 703 corresponding to the respective paper feeding stages. A sheet discharge tray 704 receives a sheet which has undergone printing.

Figure 8:
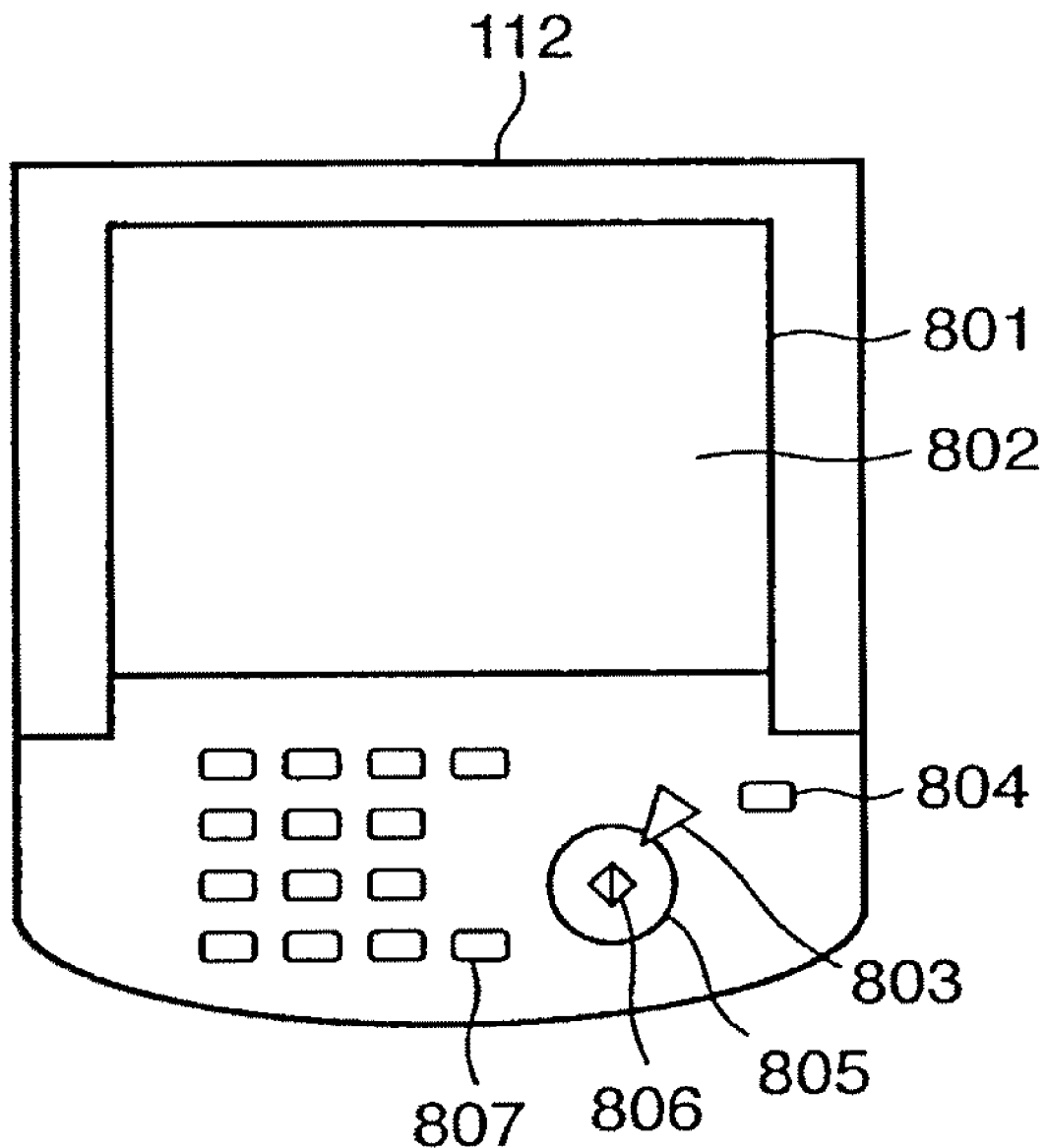
FIG. 8 is a diagram showing a structure of an operation unit 112 shown in FIG. 7.

FIG. 8 is a diagram showing a structure of the operation unit 112 shown in FIG. 7. As shown in FIG. 8, a touch panel sheet 802 is adhered on an LCD in an LCD display unit 801. When an operation screen for a system and soft keys are displayed and the displayed keys are depressed, positional information indicating depressed positions is transmitted to the controller CPU 201.

A start key 805 shown in FIG. 8 is used, for example, in the case in which a reading operation for an original image is started. In the center of this start key 805, there is a two-color LED display unit 806 consisting of green and red, which indicates whether or not the start key 805 is in a usable state with the colors. In addition, a stop key 803 functions to stop an operation which is being performed. Further, an ID key 807 is used when a user ID of a user is inputted, and a reset key 804 is used when setting from the operation unit is initialized.

Next, processing such as copy, transmission, and box in this embodiment will be described using a screen to be displayed on the LCD display unit 801.

Figure 9:
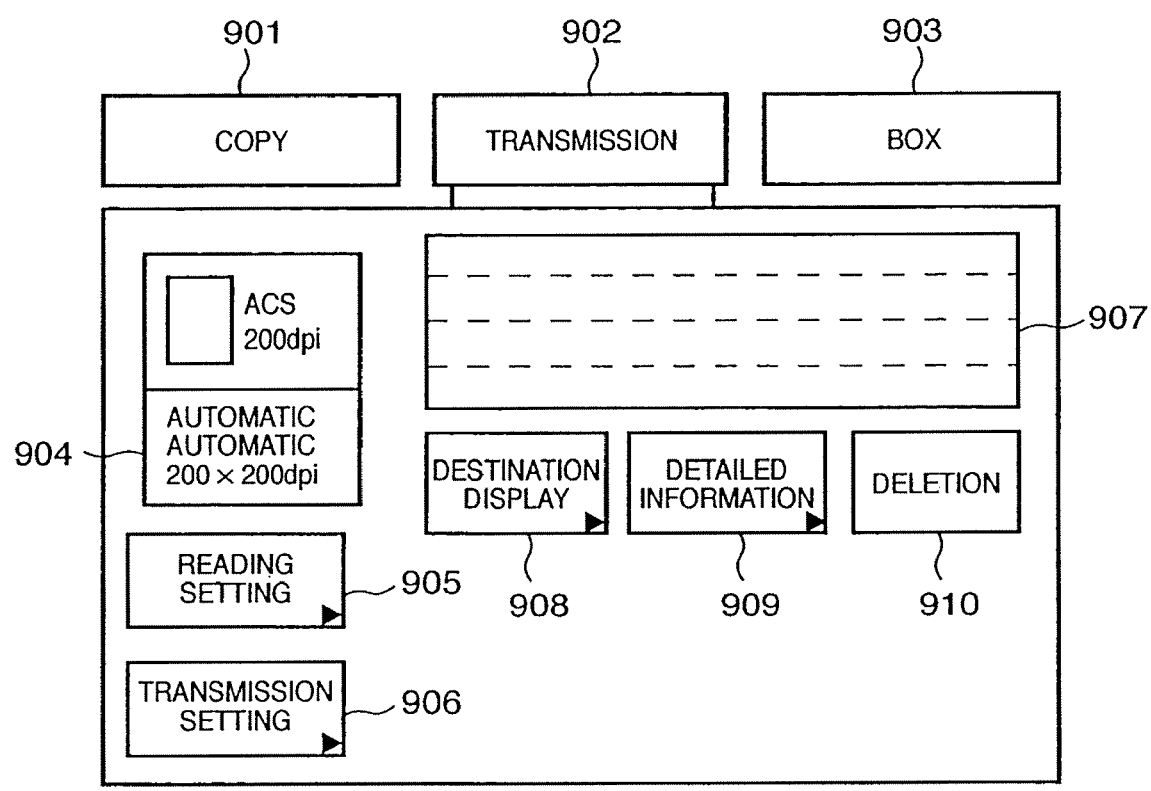
FIG. 9 is a diagram showing an initial screen in the image forming apparatus in this embodiment.

FIG. 9 is an initial screen in the image forming apparatus of this embodiment and is also a standard screen which is displayed after image forming functions are set. In FIG. 9, reference numeral 901 denotes a copy tab, which performs switching to a copy setting screen for performing copy setting. Reference numeral 902 denotes a transmission tab, which performs switching to a transmission setting screen for transmission setting for sending scanned image data with a facsimile apparatus or an electronic mail. Reference numeral 903 is a box tab, which performs switching to a box setting screen for performing setting for printing or sending a scanned image stored in an incorporated hard disk (HD).

Reference numeral 904 denotes a window for displaying setting in reading an image. Reference numeral 905 denotes a section for performing setting for a resolution, concentration, and the like at the time of image reading. Reference numeral 906 denotes a section for performing timer setting at the time of timer transmission, setting in the case in which printing is applied to a HD or a printer, and the like. Reference numeral 907 denotes a window on which a transmission destination is displayed. Reference numeral 908 is a section for displaying a transmission destination on the window 907. Reference numeral 909 denotes a section for performing display of detailed information on one destination on the window 907. Reference numeral 910 denotes a section for performing deletion of one destination displayed on the window 907.

Figure 10:
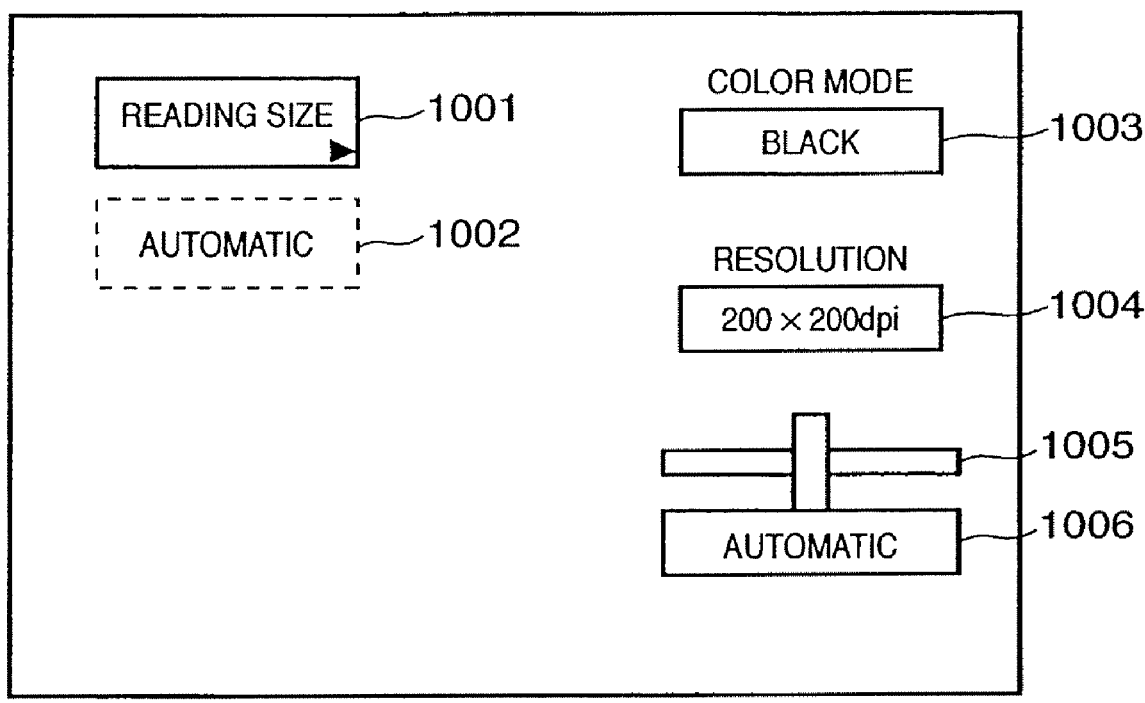
FIG. 10 is a diagram showing a popup window which is displayed when Reading setting 905 is depressed.

FIG. 10 is a diagram showing a popup window which is displayed when Reading setting 905 is depressed. In FIG. 10, reference numeral 1001 denotes a section for selecting a size of an original to be read from popup and inputting the size. A set reading size is displayed in a section 1002. Reference numeral 1003 denotes a section for selecting a reading mode of an original. When the section 1003 is depressed, the reading mode can be selected from three kinds modes of color, black, and automatic (ACS). Note that, if a result of measurement by the counter 507 shown in FIG. 5 is smaller than a predetermined value, an original is judged as a black and white original and, if the result is larger than the predetermined value, the original is judged as a color original. In the case of the color original, a color image is stored. In the case of the black original, a black and white image is stored. In the case of ACS, a color image and a result of judgment on color or black and white are stored.

Reference numeral 1004 denotes selection input from popup for designating a reading resolution. Reference numeral 1005 denotes a slider for adjusting a reading concentration of an original, and adjustment in nine stages can be performed with the slider 1005. Reference numeral 1006 is a section for automatically deciding a concentration in the case in which an image of a fogged base like a newspaper is read.

Figure 11:
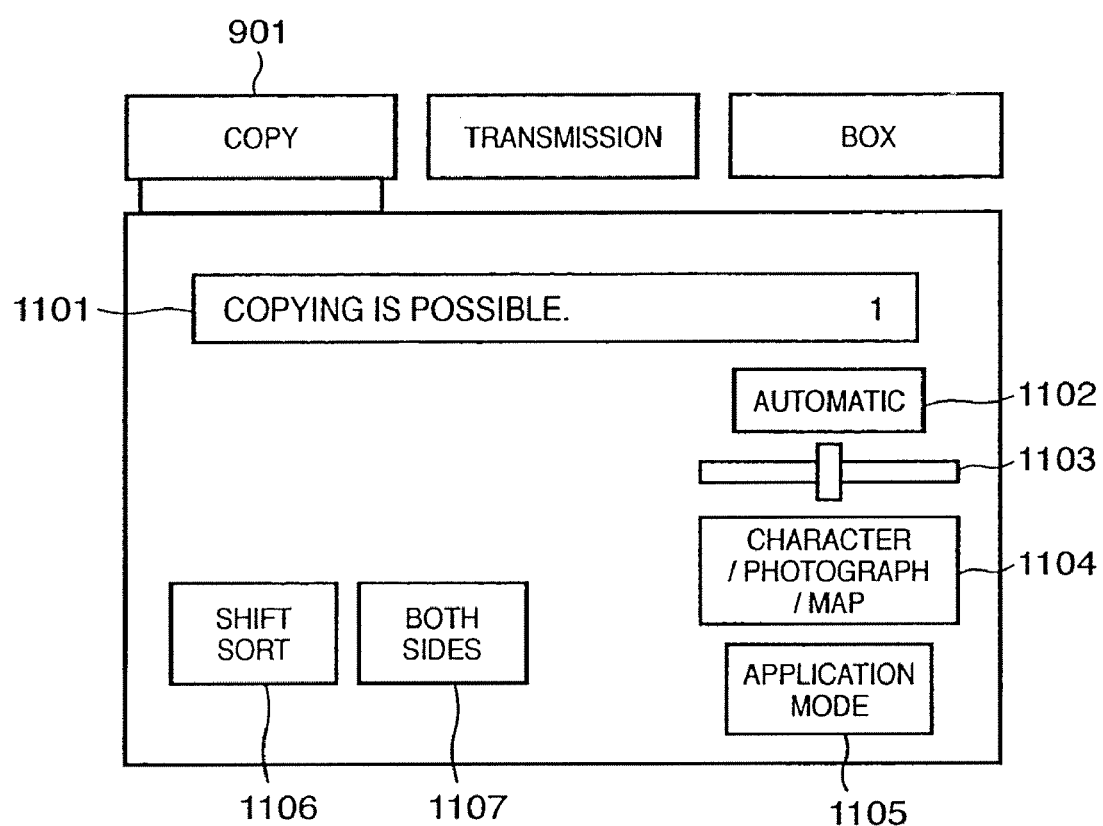
FIG. 11 is a diagram showing a screen which is displayed when a copy tab 901 is depressed.

FIG. 11 is a diagram showing a screen which is displayed when the copy tab 901 is depressed. In FIG. 11, reference numeral 1101 denotes a section for indicating whether or not the image forming apparatus is in a state in which it can copy an image and, at the same time, displays a set number of copies. Reference numeral 1102 denotes a section having the same function as the section 1006 shown in FIG. 10, which is a button for choosing whether or not base removal is performed automatically. Reference numeral 1103 denotes a slider having the same function as the slider 1005 shown in FIG. 10, which can perform concentration adjustment of nine stages. Reference numeral 1104 denotes a section for selecting a type of an original, in which character/photograph/map, character, photographic paper photograph, and printed photograph can be selected. Reference numeral 1105 denotes an application mode button, which can set a reduction layout (a function for reducing plural pieces of originals and printing them on one sheet), color balance (fine tuning of the colors C, M, Y and K), and the like. Reference numeral 1106 denotes a button for performing setting related to various kinds of finishing, which can set shift sort, staple sort, and group sort. Reference numeral 1107 denotes a button for performing setting related to two-side reading and two-sided printing.

Figure 12:
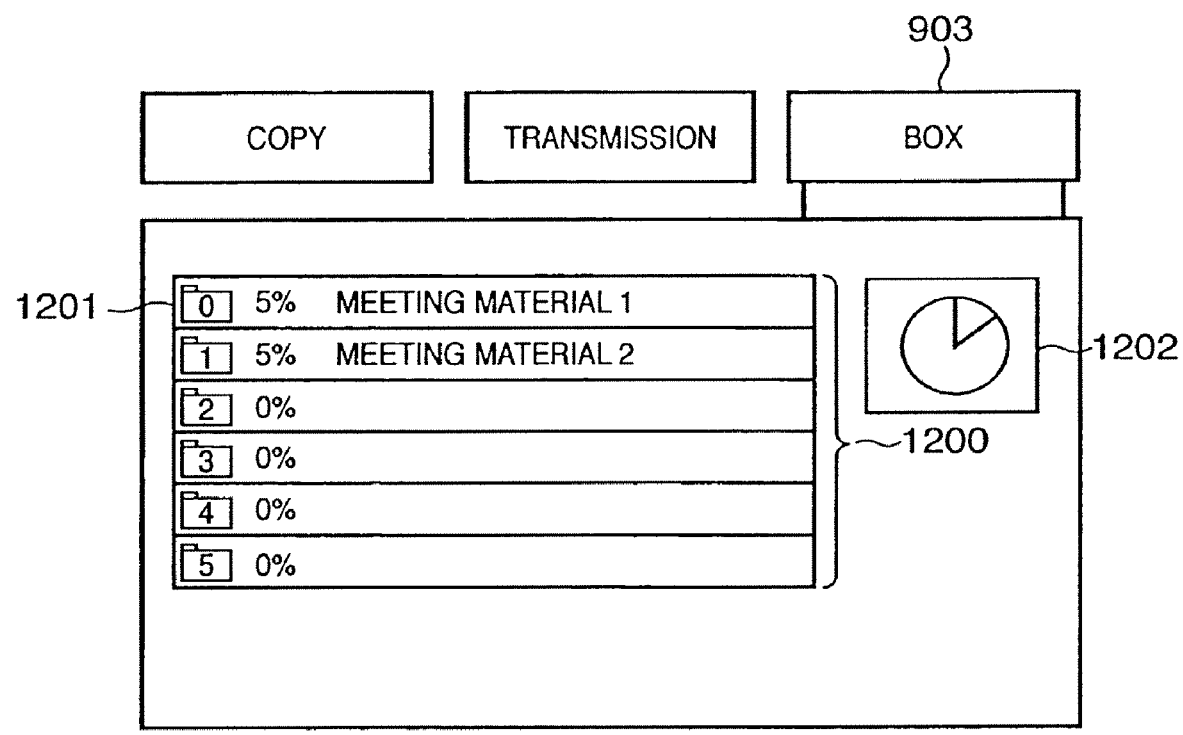
FIG. 12 is a diagram showing a screen which is displayed when a box tab 903 is depressed.

FIG. 12 is a diagram showing a screen which is displayed when the box tab 903 is depressed. In FIG. 12, reference numeral 1200 denotes folders obtained by logically sectioning the HDD 204. Note that folder numbers are allocated to the respective folders in advance, and reference numeral 1201 denotes a $0^{th}$ folder. In addition, ratios of disk capacities used by the folders are displayed beside the folder numbers. Further, arbitrary names can be attached to the folders, and the names are also displayed here. In reference numeral 1202, an entire usage of HDD is displayed.

Figure 13:
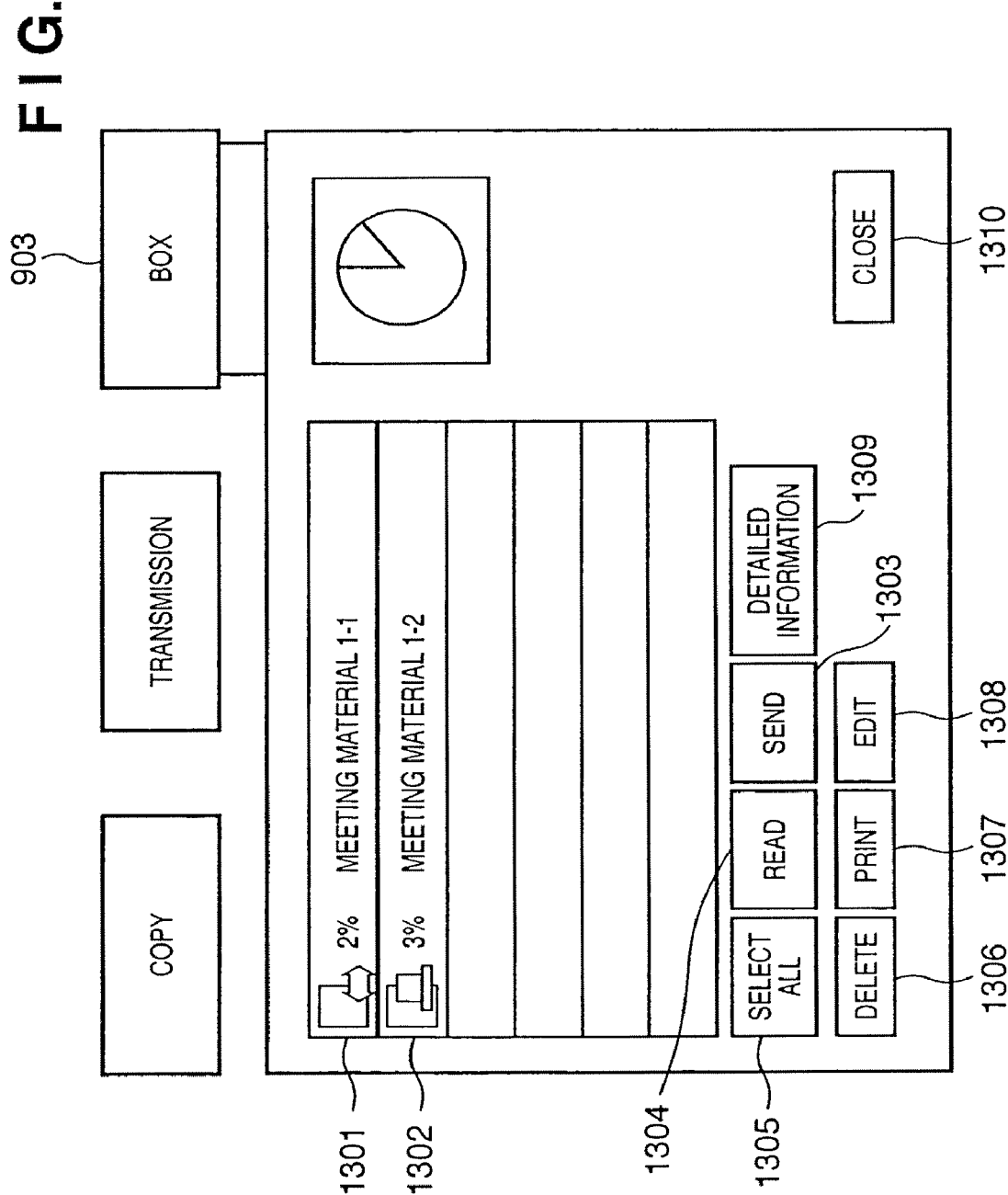
FIG. 13 is a diagram showing a screen which is displayed when Folder 1201 is depressed.

FIG. 13 is a diagram showing a screen which is displayed when the folder 1201 is depressed. In FIG. 13, reference numerals 1301 and 1302 are documents stored in the folder 1201. The respective documents are constituted by plural pages. The document 1301 is a scanned document. In 1301, an icon indicating a scanned document, an HDD usage, and a document name which a user can set arbitrarily are displayed. Similarly, the document 1302 is a PDL document stored from a PDL. In 1302, an icon indicating a PDL document, an HDD usage, and a document name which a user can set arbitrarily are displayed. In addition, by depressing the icons, it is indicated by reversal display that the documents have selected.

In addition, reference numeral 1303 denotes a button for sending a selected document. Reference numeral 1304 denotes a button for reading an original from a scanner and generating a document. Reference numeral 1305 denotes a button for selecting all documents in a folder (in the example shown in FIG. 13, the documents 1301 and 1302). Reference numeral 1306 denotes a button for deleting a selected document. Reference numeral 1307 denotes a button for printing a selected document. Reference numeral 1308 is a button for editing a selected document. For example, the button 1308 has a function for selecting two documents and combining the two documents as one document to save the document or deleting a specific page. Reference numeral 1309 denotes a button for displaying detailed information of a document selected last. By depressing this button 1309, it is possible to see a resolution, an original size, and a color other than a document name. Further, reference numeral 1310 denotes a button for closing this screen.

Next, a description will be made about software which is executed by the CPU 201 of the control unit 111 of the image forming apparatus in this embodiment having the above-described structure.

Figure 14:
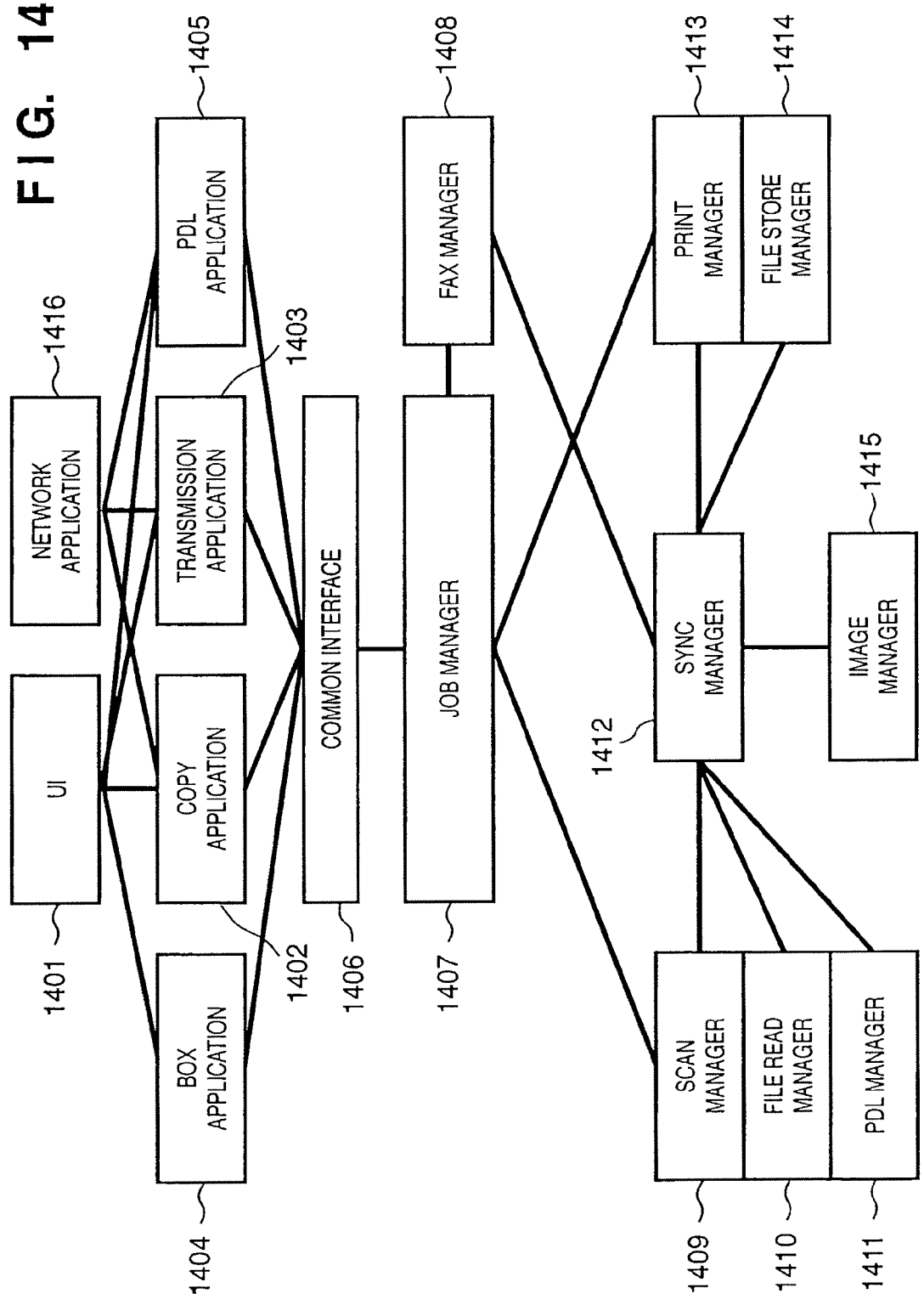
FIG. 14 is a diagram showing a software configuration in the image forming apparatus.

FIG. 14 is a diagram showing a software configuration in the image forming apparatus. In FIG. 14, reference numeral 1401 denotes a UI control unit, which controls the operation unit 112 serving as a user interface. Reference numeral 1402 denotes a copy application unit, which receives an instruction from the UI control unit 1401 and controls a predetermined apparatus control part to execute a copy job. Reference numeral 1403 denotes a transmission application unit, which controls a predetermined apparatus control part to execute a transmission job. Reference numeral 1404 denotes a BOX application unit, which temporarily stores image data. Reference numeral 1405 denotes a PDL application unit, which receives data from a network application unit 1416 and inputs a PDL print job. Reference numeral 1406 denotes a common interface unit, which absorbs an apparatus dependent part of an apparatus control part.

Reference numeral 1407 denotes a job manager, which arranges various kinds of job information received from the common interface unit 1406 and communicates the job information to document processing units in a lower layer. Here, the document processing units are a scan manager 1409 and a print manager 1413 in the case of local copy, the scan manager 1409 and a file store manager 1414 in the case of a transmission job of remote copy or a transmission job, a file read manager 1410 and the print manager 1413 in the case of a reception job of remote copy, and a PDL manager 1411 and the print manager 1413 in the case of PDL print such as LIPS or PostScript.

Note that a request for synchronization among the document processing units or image processing is made via a sync manager 1412. Image processing at the time of scanning and printing and storage of an image file are performed by an image manager 1415.

In the above-described software configuration, first, software processing of local copy will be described. According to an instruction of a user, copy setting is communicated from the UI control unit 1401 to the copy application unit 1402 together with a copy instruction. According to the copy setting, the copy application unit 1402 communicates information from the UI control unit 1401 to the job manager 1407, which performs control, via the common interface unit 1406. Then, the job manager 1407 communicates job information to the scan manager 1409 and the print manager 1413.

The scan manager 1409 requests the scanner 113 to perform scanning via a not-shown device I/F (a serial interface which connects the controller 111 and the scanner 113 as well as the controller 111 and the printer 114). At the same time, the scan manager 1409 sends an image processing request to the image manager 1415 via the sync manager 1412. The image manager 1415 performs setting of the scanner image processing unit 217 in accordance with an instruction of the scan manager 1409. When this setting is completed, the image manager 1415 communicates the completion of preparation for scanning via the sync manager 1412. Thereafter, the scan manager 1409 instructs the scanner 113 to perform scanning.

Here, the completion of scanned image transfer is transmitted to the image manager 1415 by an interrupt signal from not-shown hardware. Upon receiving the completion of scanning from the image manager 1415, the sync manager 1412 communicates the completion of scanning to the scan manager 1409 and the print manager 1413. At the same time, the sync manager 1412 instructs the image manager 1415 to change compressed images stored in the RAM 202 to a file in the HDD 204. The image manager 1415 stores an image (including a character/photograph judgment signal) on a memory in the HDD 204 in accordance with the instruction. Note that, as incidental information of the image, a not-shown result of color judgment/black and white judgment, a base skipping level for performing base skipping, a scanned image as an image input source, and color spaces R, G and B are also stored.

In addition, when the storing in the HDD 204 ends and the completion of scanning is informed by the scanner 113, the image manager 1415 informs the scan manager 1409 that the change of images to a file has ended via the sync manager 1412. Then, the scan manager 1409 returns an end notice to the job manager 1407, and the job manager 1407 returns the notice to the copy application unit 1402 via the common interface unit 1406.

On the other hand, the print manager 1413 sends a print request to the printer 114 via the device I/F at the point when the image is inputted to the memory, and requests the sync manager 1412 to perform print image processing. When the request is received from the print manager 1413, the sync manager 1412 requests the image manager 1415 to perform image processing setting. Then, the image manager 1415 performs setting of the printer image processing unit 218 in accordance with the incidental information of the image and communicates the completion of print preparation to the print manager 1413 via the sync manager 1412. Then, the print manager 1413 sends a print instruction to the printer 114.

Here, the completion of print image transfer is transmitted to the image manager 1415 by an interrupt signal from the not-shown hardware. Upon receiving the completion of printing from the image manager 1415, the sync manager 1412 communicates the completion of printing to the print manager 1413. In addition, upon receiving the completion of sheet discharge from the printer 114, the print manager 1413 returns an end notice to the job manager 1407, and the job manager 1407 returns the end notice to the copy application unit 1402 via the common interface unit 1406. Then, when the printing ends, the copy application unit 1402 informs the UI control unit 1401 of the completion of a job.

Next, in the case of a scan job of remote copy or a transmission job, in place of the print manager 1413, the file store manager 1414 receives a request from the job manager 1407. At the point when the scanned image is finished to be stored in the HDD 204, the file store manager 1414 receives a storage completion notice from the sync manager 1412 and sends the storage completion notice to the copy application unit 1402 in the case of remote copy or to the transmission application unit 1403 in the case of a transmission job via the common interface unit 1406. Then, after this notice, the copy application unit 1402 and the transmission application unit 1403 request the network application unit 1416 to send a file stored in the HDD 204. Then, the network application unit 1416, which has received this request, sends the file.

The network application unit 1416 receives setting information concerning copying from the copy application unit 1402 at the time of starting a job and informs the remote side of the setting information as well. In the case of the remote copy, the network application unit 1416 performs transmission using a communication protocol peculiar to the apparatus. In addition, in the case of the transmission job, the network application unit 1416 uses a standard file transfer protocol such as FTP or SMB.

In addition, in the case in which a file is sent by facsimile, after the file is stored, the FAX manager 1408 is instructed to send the file by the transmission application unit 1403 via the common interface unit 1406 and the job manager 1407. The FAX manager 1408 performs negotiation with an apparatus at the other end of the line via the modem 207, request the image manager 1415 to perform necessary image processing (color to black and white conversion, multivalue to binary conversion, rotation, and magnification), and send an image after conversion using the modem 207. In addition, if there is a printer in a transmission destination, the transmission application unit 1403 instructs printing as a print job via the common interface unit 1406. An operation at that point is the same as an operation in the case of a print job of remote copy to be described later. If a transmission destination is a box in an apparatus, the image is stored in a file system in the apparatus by the file store manager 1414.

Further, at the time of facsimile reception, the FAX manager 1408 receives an image using the modem 207 and stores the image in the HDD 204 as an image file. After storing the image in the HDD 204, when the storage of the image is notified to the box application unit 1404, an instruction for reception printing is sent from the box application unit 1404 to the job manager 1407 via the common interface unit 1406. Thereafter, since an operation is the same as a usual box print job, a description of the operation will be omitted.

Next, in the case of the print job of remote copy, the network application unit 1416 saves an image from a transmission side in the HDD 204 and issues a job to the copy application unit 1402. Consequently, the copy application unit 1402 inputs a print job in the job manager 1407 via the common interface unit 1406. In this case, unlike local copy, in place of the scan manager 1409, the file read manager 1410 receives a request from the job manager 1407.

The file read manager 1410 sends a request for expanding the received image from the HDD 204 to a memory to the image manager 1415 via the sync manager 1412. The image manager 1415 expands the image in the memory. At the point when the expansion ends, the image manager 1415 communicates the end of the expansion to the file read manager 1410 and the print manager 1413 via the sync manager 1412. At the point when the image is inputted to the memory, the print manager 1413 selects a sheet feeding stage instructed by the job manager 1407 or a stage of a sheet size instructed by the job manager 1407 and sends a print request to the printer 114 via the device I/F. In the case of automatic sheet feeding, a sheet feeding stage is determined from an image size to send a print request.

The print manager 1413 requests the sync manager 1412 to perform print image processing. When the request from the print manager 1413 is received, the sync manager 1412 requests the image manager 1415 to perform image processing setting. Here, for example, if sheets of an optimal size have been entirely consumed and rotation is required, the sync manager 1412 also requests the image manager 1415 to instruct rotation separately. In addition, when the rotation instruction is received, the image manager 1415 causes the image rotation unit 220 to rotate the image. The image manager 1415 performs setting of the printer image processing unit 218 and communicates the completion of print preparation to the print manager 1413 via the sync manager 1412. Then, the print manager 1413 sends a print instruction to the printer 114.

Here, the completion of print image transfer is transmitted to the image manager 1415 by an interrupt signal from the not-shown hardware. Upon receiving the completion of printing from the image manager 1415, the sync manager 1412 communicates the completion of printing to the file read manager 1410 and the print manager 1413. The file read manager 1410 returns an end notice to the job manager 1407. In addition, upon receiving the completion of sheet discharge from the printer 114, the print manager 1413 returns the end notice to the job manager 1407. The job manager 1407 returns the end notice to the copy application unit 1402 via the common interface unit 1406. Then, when the scanning and the printing end, the copy application unit 1402 informs the UI control unit 1401 of the end of the job.

Next, in the case of a PDL data expansion and storage job, a request from a host PC, which inputted a PDL print, is communicated to the PDL application unit 1405 via the network application unit 1416. Then, the PDL application unit 1405 instructs the job manager 1407 to perform the JDL data expansion and storage job via the common interface unit 1406. At this point, the PDL manager 1411 and the file store manager 1414 receive a request from the job manager 1407. Processing from the end of the expansion of an image until the input of an image is the same as the above-described scan job. An image (including a character/photograph judgment signal) on a memory is stored in the HDD 204. Note that color/black and white information, a PDL image as an image input source, color spaces C, M, Y and K, or R, G and B are also store in a not-shown SRAM as incidental information of the image.

At the point when the PDL image is finished to be stored in the HDD 204, the file store manager 1414 receives a storage completion notice from the sync manager 1412 and sends the storage completion notice to the PDL application unit 1405 via the common interface unit 1406. After this notice, the PDL application unit 1405 informs the network application unit 1416 of the completion of storage in the HDD 204. This information is communicated to the host PC which inputted the PDL print. In addition, in the case of a PDL print job, the image expanded on the memory is printed by the PDL manager 1411 and the print manger 1413.

Next, in printing of the image PDL-developed and stored image, the BOX application unit 1404 issues a stored document, which is instructed to be printed by UI 1401, as a job. This BOX application unit 1404 inputs a print job in the job manager 1407 via the common interface unit 1406. In this case, unlike the local copy, in place of the scan manager 1409, the file read manager 1410 receives a request from the job manager 1407. The file read manager 1410 sends a request for expanding the image, which is instructed to be printed, from the HDD 204 to the memory to the image manager 1415 via the sync manager 1412. Note that, since an operation after this is the same as the operation described in relation to the print job of the remote copy, a description of the operation will be omitted.

Next, a description will be made about "follow-up control" in this embodiment, which causes the printer 114 to start printing when a predetermined amount of image data read by the scanner 113 is stored in a memory in order to carry out a high-speed copy mode at higher speed.

Figure 15:
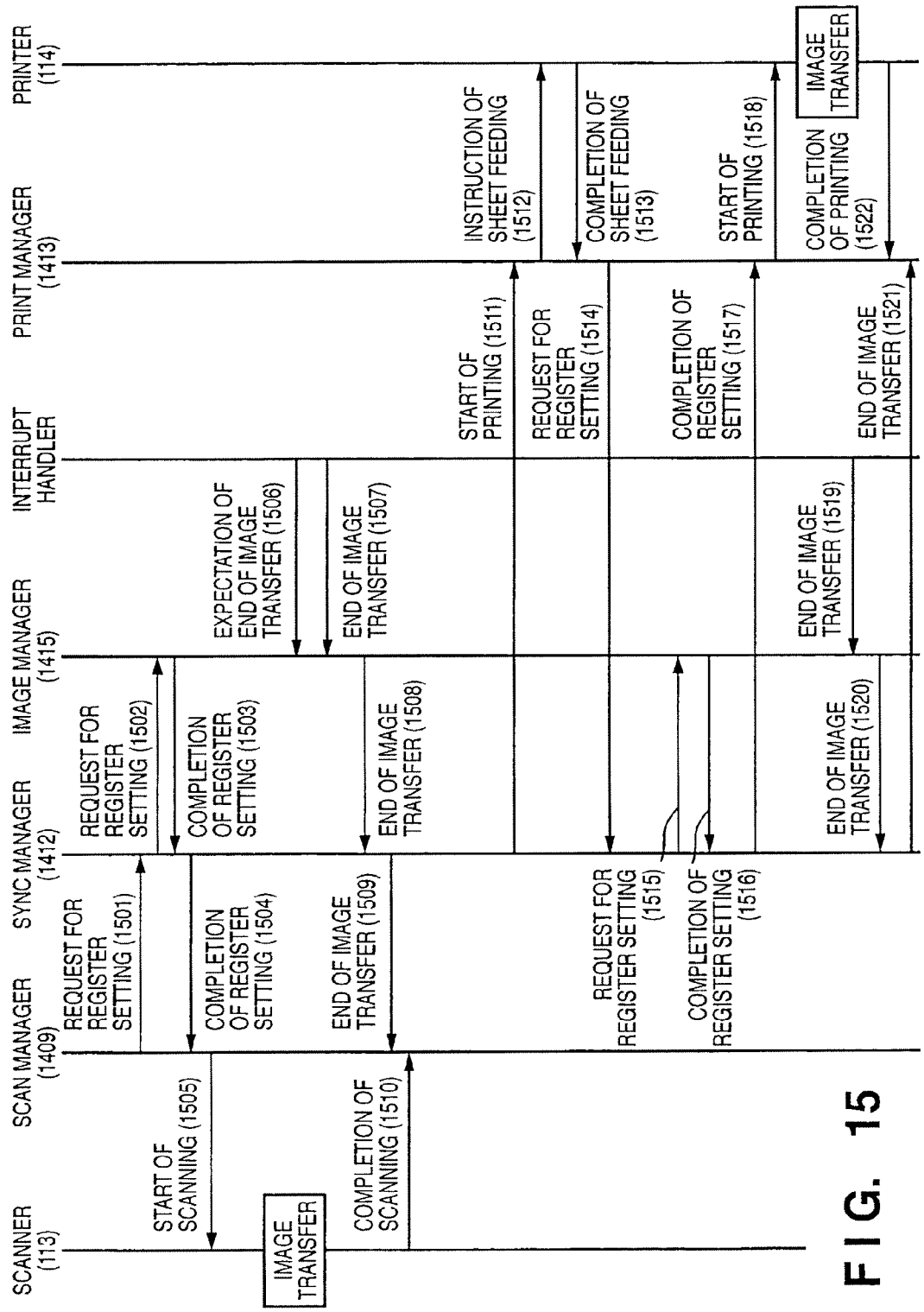
FIG. 15 is a diagram showing a copy sequence for one page.

FIG. 15 is a diagram showing a copy sequence for one page. When a request from the job manager 1407 is received, the scan manager 1409 requests the sync manager 1412 to perform register setting for scanning in a copy mode (1501). The sync manager 1412 transfers the register setting request to the image manager 1415 (1502). Here, the image manager 1415 performs image setting for scanning according the copy mode and, when the setting ends, informs the sync manager 1412 of the completion of the register setting (1503). The sync manager 1412 informs the scan manager 1409 of the completion of the register setting (1504). Then, the scan manager 1409 instructs the scanner 113 to start scanning (1505). Thereafter, transfer of an image is performed together with an image synchronization signal, which is outputted from the scanner 113, and an image is captured on a memory.

Here, in the case in which the job manager 1407 judges that the follow-up control is possible in the copy mode according a judgment method to be described later, an image transfer end expectation signal is outputted from the DMA controller 210. The image transfer end expectation signal is generated as an interrupt signal in the middle of the image transfer. An interrupt handler processes this interrupt signal and informs the image manager 1415 of the expectation of the end of the image transfer (1506). In addition, when the image transfer ends, the DMA controller 210 transmits the interrupt signal. The interrupt handler communicates a notice of the end of the image transfer to the image manager 1415 on the basis of the interrupt signal (1507). When the expectation of the end of the image transfer or the end of the image transfer is informed, the image manager 1415 informs the sync manager 1412 of the end of the imager transfer (1508). When the end of the image transfer is informed, the sync manager 1412 informs the scan manager 1409 of the end of the image transfer (1509). Then, at the time of the end of the scanning, the scanner 113 informs the scan manager 1409 of the completion of the scanning is transferred from (1510).

Upon receiving the notices of the completion from the scanner 113 and the sync manager 1412, the scan manager 1409 completes the scanning for one page. When the end of the image transfer (1508) is informed, the sync manager 1412 informs the print manger 1413 that it is possible to start printing (1511). Next, the print manager 1413 issues a sheet feeding request to the printer 114 (1512). When sheet feeding is completed, the printer 114 informs the print manager 1413 of the completion of sheet feeding (1513). In response to a request from the job manager 1407, the print manager 1413 requests the sync manager 1412 to perform register setting for printing in a requested copy mode (1514). The sync manager 1412 transfers the register setting request to the image manager 1415 (1515). Here, the image manager 1415 performs image setting for printing according to the copy mode. When the register setting is completed, the image manager 1415 informs the sync manager 1412 of the completion of the setting (1516). The sync manager 1412 also informs the print manager 1413 of the completion of the setting (1517).

The print manager 1413 instructs the printer 114 to start printing (1518). The printer 114 generates an image synchronization signal to thereby receive an image signal from the controller. When image transfer ends, an interrupt signal is generated, and the interrupt handler informs the image manager 1415 of the end of the image transfer on the basis of the interrupt signal (1519). The end of the image transfer is transmitted from the image manager 1415 to the sync manager 1412 (1520). Thereafter, the end of the image transfer is transmitted from the sync manager 1412 to the print manager 1413 (1521). The completion of the printing is transmitted from the printer 114 to the print manager 1413. Upon receiving the completion of the printing and the completion of the image transfer, the print manager 1413 completes the printing of one page.

Next, a judgment method of judging whether or not the follow-up control is performed in the job manager 1407 will be described.

Figure 16:
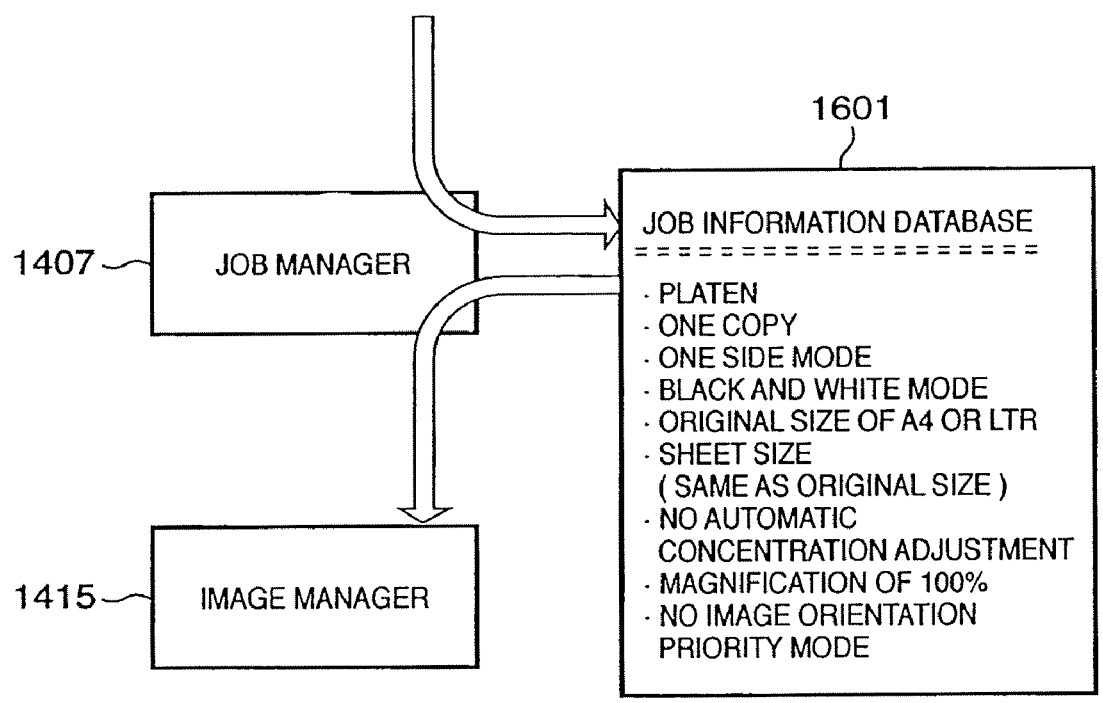
FIG. 16 is a diagram for explaining a method of judging whether or not follow-up control is to be performed.

FIG. 16 is a diagram for explaining the judgment method of judging whether or not the follow-up control is performed. At the time of starting a copy job, the job manager 1407 stores setting concerning the copy job, which is received from the common interface unit 1406, in a job information database 1601 shown in FIG. 16. The image manager 1415 inquires of the job manager 1407 whether or not the follow-up control is possible at timing of the request for register setting (1502). Here, the job manager 1407 informs whether or not a follow-up mode is possible with reference to the job information database 1601.

For example, as shown in FIG. 16, in the case of a platen mode, one copy, copy from one side to one side, a black and white mode, an original size of A4 or LTR, a sheet size same as the original size, no automatic concentration adjustment, magnification of 100%, and no image rotation as shown in FIG. 16, the job manager 1407 informs that the follow-up control is possible.

As described above, in this embodiment, in the case in which an amount of memory consumption is relatively small as in a black and white image as opposed to a color image, or in the case in which high-speed copy without designation requiring time such as magnification conversion and image rotation is requested, it is judged that the follow-up control is possible.

Figure 17:
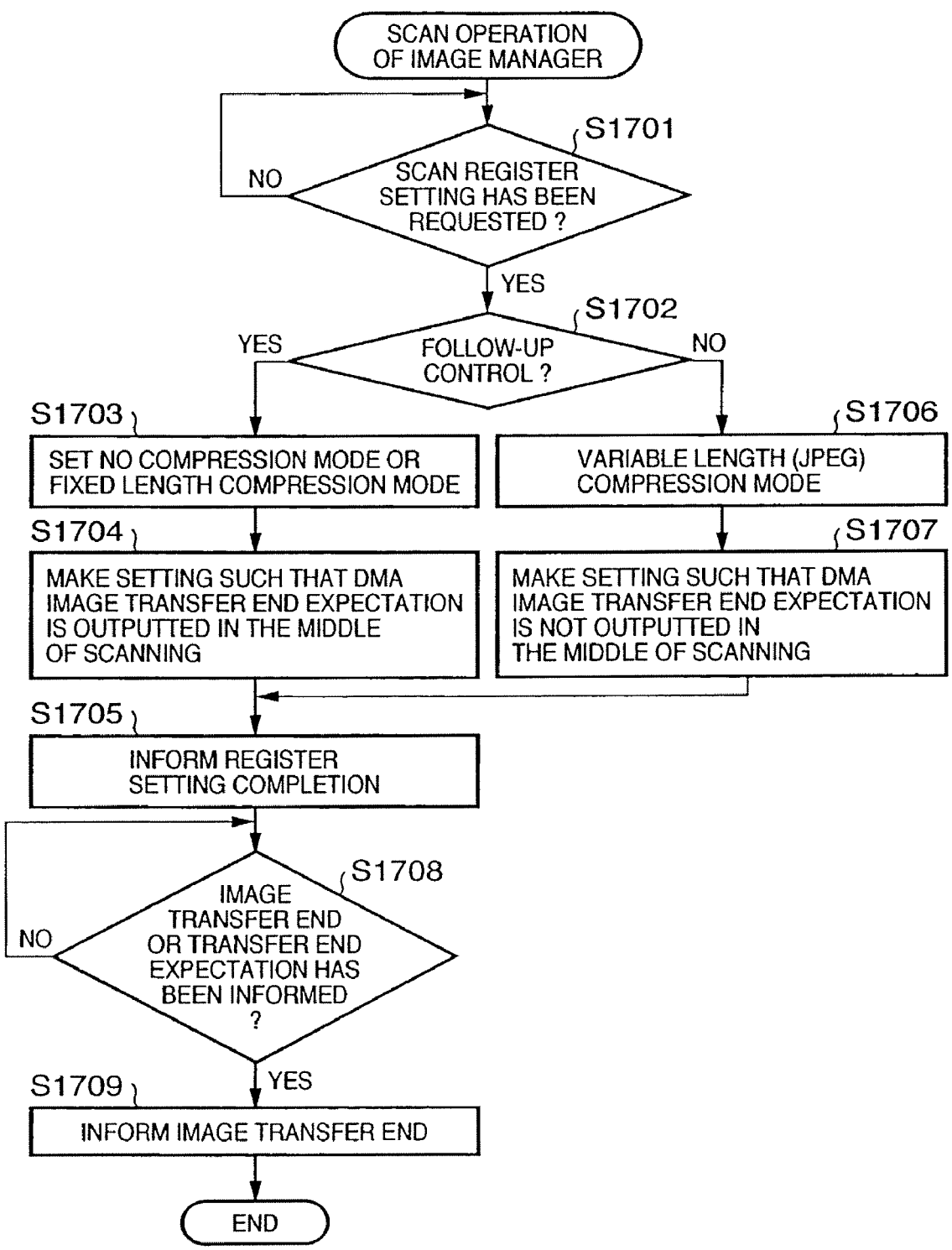
FIG. 17 is a flowchart showing follow-up control of an image manager 1415.

FIG. 17 is a flowchart showing the follow-up control of the image manager 1415. First, in step S1701, the image manager 1415 judges whether or not a register setting request has been received. If the register setting request has been received, the image manager 1415 proceeds to step S1702 and inquires of the job manager 1407 whether or not the follow-up control is performed as described above. As a result, if the job manager 1407 informs that the follow-up control is possible, the image manager 1415 proceeds to step S1703 and sets a register to a mode for not compressing image data read by the scanner 113 or a fixed length compression mode. Then, in step S1704, the image manager 1415 applies setting to the DMA controller 210 so as to output an image transfer end expectation signal in the middle of scanning.

In addition, if the job manager 1407 informs that the follow-up control is impossible in step S1702, the image manager 1415 proceeds to step S1706 and sets the register to a variable length (JPEG) compression mode. Then, in step S1707, the image manager 1415 applies setting to the DMA controller 210 so as not to output an image transfer end expectation signal in the middle of scanning.

Next, when the register setting ends, in step S1705, the image manager 1415 returns a register setting completion notice to the sync manager 1412. Then, the image manager 1415 waits for an image transfer end notice or an interrupt signal for image transfer end expectation from the interrupt handler. If the interrupt signal is received, the image manager 1415 proceeds to step S1709 and sends the image transfer end notice to the synch manager 1412.

As described above, according to this embodiment, in the case of a predetermined mode such as a high-speed copy mode, non-compression or fixed length compression is used. Thus, an amount of codes per fixed time is fixed, and the follow-up control can be performed. Moreover, since non-compression or fixed length compression is used only in the case of a predetermined mode and variable length compression is used in the other modes, an amount of memory consumption can also be reduced.

Note that, in this embodiment, it is judged that the follow-up control is possible in the case of the high-speed copy mode. However, the present invention is not limited to this and may be applied to, for example, the case in which a PDL code is inputted from the PC 101 and expanded by the RIP 216 in a memory and, when a predetermined amount is expanded, the printer 114 is controlled to start printing.

In addition, the present invention may be applied to a system constituted by plural apparatuses (e.g., a host computer, an interface apparatus, a reader, a printer, etc.) or may be applied to an apparatus consisting of one device (e.g., a copying machine, a facsimile apparatus, etc.).

Moreover, it is needless to mention that the object of the present invention can also be attained by supplying a recording medium, which has recorded therein a program code for software realizing the functions of the embodiment, to a system or an apparatus, and a computer (CPU or MPU) of the system or the apparatus reading out and executing a program code stored in the recording medium.

In this case, a program code itself read out from the recording medium realizes the functions of the embodiment, and the recording medium having stored the program code therein constitutes the present invention.

As a recording medium for supplying this program code, for example a floppy (registered trademark) disk, a hard disk, an optical disk, a magneto-optical disk, a CD-ROM, a CD-R, a magnetic tape, a nonvolatile memory card, a ROM, and the like can be used.

In addition, it is needless to mention that the present invention includes not only a case in which the functions of the embodiment are realized by the computer executing the read-out program code but also a case in which an OS (operating system) running on the computer performs actual processing partly or entirely on the basis of an instruction of the program code, and the functions of the embodiment are realized by the processing.

Moreover, it is needless to mention that the present invention includes a case in which, after the program code read out from the recording medium is written in a memory provided in a function extension board inserted in the computer or a function extension unit connected to the computer, a CPU or the like provided in the function extension board or the function extension unit performs actual processing partly or entirely on the basis of an instruction of the program code, and the functions of the embodiment are realized by the processing.

As described above, according to the embodiment, image input/output processing from input and storage of an image in a memory until output of the stored image can be performed at high speed.

The present invention has been described according to the preferred embodiment. However, the present invention is not limited to the embodiment, and various modifications are possible within a scope of descriptions in the appended claims.

What is claimed is:

1. An image input/output control method for a device that transfers one page data to a memory and outputs the one page data from the memory, the method comprising:

compressing one page data using variable length compression, transferring the compressed one page data to the memory, and initiating output of the transferred one page data from the memory after the transfer of the compressed one page data terminates; and transferring one page data to the memory without compressing the one page data, and initiating output of the transferred one page data transferred from the memory while the one page data is being transferred to the memory.

2. The method according to claim 1, wherein whether or not the variable length compression is performed is determined according to a copy mode.

3. The method according to claim 1, wherein whether or not the variable length compression is performed is determined according to copy magnification.

4. The method according to claim 1, wherein whether or not the variable length compression is performed is determined according to a platen mode.

5. The method according to claim 1, wherein whether or not the variable length compression is performed is determined according to a sheet size same as an original size.

6. The method according to claim 1, wherein whether or not the variable length compression is performed is determined according to no automatic concentration adjustment.

7. An image input/output control method for a device that transfers one page data to a memory and outputs the one page data from the memory, the method comprising:

determining, based on job settings, whether output of the one page data from the memory can be initiated while the one page data is being transferred to the memory;

controlling a compression mode for the one page data being transferred to the memory in accordance with the determination made in said determining step; and controlling a timing for initiating output of the one page data from the memory in accordance with the determination made in said determining step.

8. An image input/output control method for a device that transfers one page data to a memory and outputs the one page data from the memory, the method comprising:

transferring, in a case where the size of an image is being changed, one page data to the memory, and initiating output of the transferred one page data from the memory after the transfer of the one page data terminates; and transferring, in a case where size of an image is not being changed, one page data to the memory and initiating output of the transferred one page data transferred from the memory while the one page data is being transferred to the memory.

9. An image input/output control method for a device that transfers one page data to a memory and outputs the one page data from the memory, the method comprising:

transferring, in case of image rotation, one page data to the memory, and initiating output of the transferred one page data from the memory after the transfer of the one page data terminates; and transferring, in case of no image rotation, one page data to the memory and initiating output of the transferred one page data transferred from the memory while the one page data is being transferred to the memory.

10. An image input/output control apparatus that transfers one page data to a memory and outputs the one page data from the memory, the apparatus comprising:

a compression unit adapted to compress one page data using variable length compression, transferring the compressed one page data to the memory, and initiating output of the transferred one page data from the memory after the transfer of the compressed one page data terminates; and a transfer unit adapted to transfer one page data to the memory without compressing the one page data, and initiating output of the transferred one page data transferred from the memory while the one page data is being transferred to the memory.

11. The apparatus according to claim 10, wherein whether or not the variable length compression is performed is determined according to a copy mode.

12. The apparatus according to claim 10, wherein whether or not the variable length compression is performed is determined according to copy magnification.

13. The apparatus according to claim 10, wherein whether or not the variable length compression is performed is determined according to a platen mode.

14. The apparatus according to claim 10, wherein whether or not the variable length compression is performed is determined according to a sheet size same as an original size.

15. The apparatus according to claim 10, wherein whether or not the variable length compression is performed is determined according to no automatic concentration adjustment.

* * * * *